United States Patent
Dogrultan et al.

(10) Patent No.: US 9,639,522 B2
(45) Date of Patent: May 2, 2017

(54) METHODS AND APPARATUS RELATED TO DETERMINING EDIT RULES FOR REWRITING PHRASES

(71) Applicant: Google Inc., Mountain View, CA (US)

(72) Inventors: Ertan Dogrultan, San Francisco, CA (US); Advay Mengle, Sunnyvale, CA (US)

(73) Assignee: GOOGLE INC., Mountain View, CA (US)

(*) Notice: Subject to any disclaimer, the term of this patent is extended or adjusted under 35 U.S.C. 154(b) by 84 days.

(21) Appl. No.: 14/591,734

(22) Filed: Jan. 7, 2015

(65) Prior Publication Data

US 2016/0062981 A1    Mar. 3, 2016

Related U.S. Application Data

(60) Provisional application No. 62/044,858, filed on Sep. 2, 2014.

(51) Int. Cl.
*G06F 17/27* (2006.01)
*G06F 17/24* (2006.01)

(52) U.S. Cl.
CPC ............ *G06F 17/274* (2013.01); *G06F 17/24* (2013.01); *G06F 17/241* (2013.01); *G06F 17/272* (2013.01); *G06F 17/2735* (2013.01)

(58) Field of Classification Search
CPC ........ G06F 17/21; G06F 17/211; G06F 17/22; G06F 17/24; G06F 17/27; G06F 17/28; G06F 17/2705; G06F 17/273; G06F 17/274; G06F 17/2785
USPC ....... 704/1–10, 235, 251–257; 715/255, 271, 715/229
See application file for complete search history.

(56) References Cited

U.S. PATENT DOCUMENTS

| | | |
|---|---|---|
| 5,598,518 A | 1/1997 | Saito |
| 5,903,858 A | 5/1999 | Saraki |
| 7,440,889 B1 | 10/2008 | Skiena et al. |
| 8,190,419 B1 | 5/2012 | Kinder |
| 2007/0073532 A1 | 3/2007 | Brockett et al. |
| 2007/0219773 A1* | 9/2007 | Roux ................ G06F 17/27 704/1 |

(Continued)

FOREIGN PATENT DOCUMENTS

WO       02/29622       4/2002

OTHER PUBLICATIONS

Acrolinx: "Definition of post-editing rules for English, French, German and Japanese," ACCEPT Automated Community Content Editing Portal; 7 pages; Aug. 26, 2013.

(Continued)

*Primary Examiner* — Marivelisse Santiago Cordero
*Assistant Examiner* — Stephen Brinich
(74) *Attorney, Agent, or Firm* — Middleton Reutlinger

(57) ABSTRACT

Methods and apparatus related to determining an edit rule based on a plurality of edits. Some implementations are directed to identifying the plurality of edits in one or more documents and determining an edit rule based on the pre-edit and post-edit phrases of the edits. Some implementations are directed to identifying the edits from one or more mature documents. The determined edit rule may be utilized to determine one or more candidate rephrasings of a subsequent phrase.

22 Claims, 7 Drawing Sheets

(56) References Cited

U.S. PATENT DOCUMENTS

2007/0250460 A1* 10/2007 Armstrong ............. G06N 5/025
706/11
2008/0052290 A1* 2/2008 Kahn ................ G06F 17/30171

OTHER PUBLICATIONS

Bouillon et al.: "Definition of Post-Editing Rules for English, French, German and Japanese," ACCEPT Automated Community Content Editing Portal; 15 pages; Jun. 30, 2014.
International Search Report and Written Opinion of PCT Serial No. PCT/US15/048131 Dec. 11, 2015.

* cited by examiner

METHODS AND APPARATUS RELATED TO DETERMINING EDIT RULES FOR REWRITING PHRASES

BACKGROUND

A user may enter text in one or more applications and be provided with one or more rewrites of the text by the one or more applications. The provided rewrites may be based on one or more terms in the text and may provide the user with options that may be selected to replace the text. For example, a user may be provided with one or more terms to replace a misspelled term that has been entered by the user.

SUMMARY

The present disclosure generally pertains to methods and apparatus related to determining edit rules for rewriting phrases. The edit rules may be determined based on identified edits of phrases by users in a plurality of documents. Some implementations are directed to identifying a large quantity of user edits in documents, wherein each of the user edits indicates a change from a pre-edit phrase to a post-edit phrase (e.g., an edit of phrase "A" to phrase "B"). Edit rules may then be determined based on the pre-edit and post-edit phrases of the identified edits and the edit rules may be stored for later utilization. As one example, the identified edits may include a large number of edits from phrase "A" to phrase "B" and a large number of edits from phrase "A" to phrase "C". Based on those identified edits, an edit rule may be determined that associates phrase "A" with phrase "B" and/or phrase "C". The edit rule may be stored and utilized to determine, for a future phrase conforming to phrase "A", one or more rephrasings of the future phrase based on phrase "B" and/or phrase "C". The rephrasings may be utilized for various purposes such as presenting the rephrasings to a user as candidate rephrasings for the future phrase, automatically rewriting the future phrase, etc.

In some implementations, the identified user edits in documents may include, or be restricted to, edits in documents that have at least a threshold maturity level. In some versions of those implementations, those user edits from documents that have at least a threshold maturity level may be given a greater weight in determining edit rules than those user edits from documents that do not have at least a threshold maturity level. A document maturity level generally indicates the completeness of the document and identifying edits from documents with at least a threshold maturity level may help avoid utilizing early and potentially less useful edits of users in determining edit rules. Various techniques may be utilized to determine a document maturity level. For example, a document maturity level may be determined based on identifying that at least a threshold amount of time has elapsed since creation of the document, identifying at least a threshold time period since the document has last been modified (i.e., identifying a "break" by a user), identifying that the document editor has changed from one user to a second user, and/or identifying that the document has been emailed, published, or otherwise provided to one or more additional users.

An edit rule determined based on identified edits generally indicates one or more edits or rephrases that have been utilized by users to change a first phrase to one or more second phrases. The second phrases may represent, for example: one or more corrections to grammatical issues with the first phrase, an improvement in clarity with respect to the first phrase, a condensed or expanded version of the first phrase, and/or an improvement in quality to the first phrase. In some implementations, an edit rule may define an explicit transformation of a pre-edit phrase represented as an n-gram to one or more post-edit phrases represented as n-grams. For example, multiple user edits of phrase "A" to phrase "B" may be identified and an edit rule that defines phrase "B" as a post-edit phrase of phrase "A" may be determined based on the multiple user edits. Also, for example, additional user edits of phrase "A" may be identified that indicate that multiple users changed phrase "A" to phrase "C", and an edit rule may be determined that defines both phrase "B" and phrase "C" as post-edit phrases of phrase "A". Weights may optionally be determined for each of the post-edit phrases ("B" and "C") for the pre-edit phrase "A". Each weight may generally indicate the likelihood of rephrasing the pre-edit phrase "A" to the respective post-edit phrase and may be based on, for example, counts of identified edits from String A to the respective post-edit phrase.

In some implementations, an edit rule may define one or more characteristics associated with a pre-edit phrase and/or one or more post-edit phrases. For example, an edit rule may include one or more categories of terms in the pre-edit phrase and/or post-edit phrase(s) of the edit rule. For example, a set of user edits may be determined that includes pre-edit phrases with the format "[noun] are [adjective]" and with post-edit phrases with the format "[plural noun] are [adjective]." Also, for example, the identified edits may include one or more pre-edit phrases of the format "[noun] are [adjective]" and post-edit phrases of the format "[noun] is [adjective]." In some implementations, weights of the two post-edit phrase formats may be determined based on counts of edits of each type. As an example, a set of edits may be determined that have pre-edit phrases conforming to the format "[noun] are [adjective]," such as a set of edits that includes Edit 1 of "The cat are cute" to "The cats are cute," Edit 2 of "Dog are loyal" to "Dogs are loyal," and Edit 3 of "Bob are smart" to "Bob is smart." An edit rule may be determined from the set of edits for pre-edit phrases of the subset of the format "[noun] are [adjective];" and an edit rule may be determined that has a post-edit phrase of "[noun] are [adjective]," with an edit weight of 0.6667 for edits to "[plural noun] are [adjective]" and an edit weight of 0.3333 for edits to "[noun] is [adjective]."

In some implementations, edit rules may be determined based on user edits that conform to one or more attributes and may be associated with those attributes (e.g., for more prominent future use in rephrasing in situations where one or more of those attributes are present). For example, an edit rule may be determined that is specific to a type of document and it may be utilized only for determining candidate rephrasings for other documents of that type and/or candidate rephrasings generated on that edit rule may be favored for other documents of that type. For instance, edits from documents that are patent applications may be identified and one or more edit rules may be determined that are applicable to other documents that are patent applications but that may not be applicable to other documents that are personal letters. As another example, an edit rule may be determined that is specific to a group of users having one or more shared or similar attributes. For example, an edit rule may be determined from edits of a group of users in a geographic region and the edit rule may not be applied to future documents associated with users in a second geographic region or rephrasings generated based on the edit rule may be given less favorable treatment for future documents associated with users in the second region (e.g., due to regional colloquialisms, regional differences in word usage, different languages).

In some implementations, a computer implemented method is provided that includes: identifying, from at least one database, edits from a plurality of users, wherein each of the edits identifies one of a plurality of pre-edit phrases and an associated one of a plurality of post-edit phrases and each of a plurality of the edits is based on a user implemented change of the one of the pre-edit phrases to the one of the post-edit phrases in one of a plurality of mature documents; determining an edit rule pre-edit phrase based on a set of one or more of the pre-edit phrases identified by the edits; determining one or more edit rule post-edit phrases based on one or more of the post-edit phrases associated with the set of the one or more pre-edit phrases; defining an edit rule that associates the edit rule pre-edit phrase with the edit rule post-edit phrases; and storing the edit rule for automatically determining, for a future phrase conforming to the edit rule pre-edit phrase, a rephrasing of the future phrase based on at least one of the edit rule post-edit phrases.

This method and other implementations of technology disclosed herein may each optionally include one or more of the following features.

At least one document of the mature documents may be identified as mature based on at least one of: a creation time of the document; an amount of time since the document was last modified; and a user associated with the document. In some of those instances, the document may be identified as mature if the user is not the creator of the document.

The method may further include determining a given edit of the edits and storing the given edit in the database. In some of those instances, the given edit may be from a given document of the mature documents and the method may further include: determining the given document is mature, wherein determining the given edit may be based on determining the given document is mature. Determining the given document is mature may based on at least one of: a creation time of the document; an amount of time since the document was last modified; and a user associated with the document.

The method may further include: determining the set of the one or more of the pre-edit phrases based on at least one characteristic associated with each of the pre-edit phrases of the set. In some of those instances, the characteristic may indicate a purpose for the mature documents on which the pre-edit phrases of the set are based. The characteristic may indicative of one or more attributes of users associated with the documents on which the pre-edit phrases of the set are based.

Determining the one or more edit rule post-edit phrases may include: identifying a first post-edit phrase of the post-edit phrases associated with the set of one or more pre-edit phrases; determining a first count of associations of the first post-edit phrase with the one or more pre-edit phrases of the set; and based on the first count of associations satisfying a threshold, determining at least one of the edit rule post-edit phrases based on the first post-edit phrase. The threshold may be a fixed threshold. In some instances, the method may further include: identifying a second post-edit phrase of the post-edit phrases associated with the set of one or more pre-edit phrases; and determining a second count of associations of the second post-edit phrase with the one or more pre-edit phrases of the set, wherein the threshold is based on the second count of associations.

The method may further include: identifying a first post-edit phrase and a second post-edit phrase of the post-edit phrases associated with the set of one or more pre-edit phrases; determining a first edit rule post-edit phrase of the edit rule post-edit phrases based on the first post-edit phrase; and determining a second edit rule post-edit phrase of the edit rule post-edit phrases based on the second post-edit phrase. In some of those instances the method may further include: determining a first count of associations of the first post-edit phrase with the one or more pre-edit phrases of the set; and determining a second count of associations of the second post-edit phrase with the one or more pre-edit phrases of the set, and wherein defining the edit rule includes: defining a first association of the edit rule pre-edit phrase with the first edit rule post-edit phrase and assigning a first weight to the first association, the first weight determined based on the first count of associations; and defining a second association of the edit rule pre-edit phrase with the second edit rule post-edit phrase and assigning a second weight to the second association, the second weight determined based on the second count of associations.

The method may further include: identifying a first post-edit phrase associated with the set of one or more pre-edit phrases; determining a first edit rule post-edit phrase of the edit rule post-edit phrases based on the first post-edit phrase; and wherein defining the first edit rule include: defining an association of the edit rule pre-edit phrase with the first edit rule post-edit phrase and assigning a weight to the association, the weight determined based on one or more edit experience measures of one or more of the users that implemented change of the pre-edit phrases of the set to the first post-edit phrase. A given edit experience measure of a given user of the users may be based on one of: quality of previous edits of the given user and number of other edits performed by the given user.

The pre-edit phrases of the set and the edit rule pre-edit phrase may each include only terms.

The edit rule pre-edit phrase may include one or more category identifiers, each of the category identifiers indicating one of: a part of speech, a category of entities, and a set of terms.

At least one of the edit rule post-edit phrases may include one or more category identifiers, each of the category identifiers indicating one of: a part of speech, a category of entities, and a set of terms. The method may further include: determining the category identifiers based on identifying members associated with the category identifiers in a plurality of the post-edit phrases associated with the set of the one or more pre-edit phrases.

At least one of the edit rule post-edit phrases may include only terms.

The method may further include: identifying a current document; identifying a phrase in the current document; determining the phrase conforms to the edit rule pre-edit phrase; and providing a candidate rephrasing of the phrase based on an edit rule post-edit phrase of the edit rule post-edit phrases. In some of those instances, the method may further include: identifying a selection of the candidate rephrasing to replace the phrase in the current document; and adjusting, based on the selection, a weight associated with the edit rule post-edit phrase for the edit rule. In some of those instances, providing the candidate rephrasing may be based on an attribute of the current document. In some of those instances, the method may further include: identifying an editor associated with the current document; and wherein providing the candidate rephrasing is further based on an attribute of the user.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
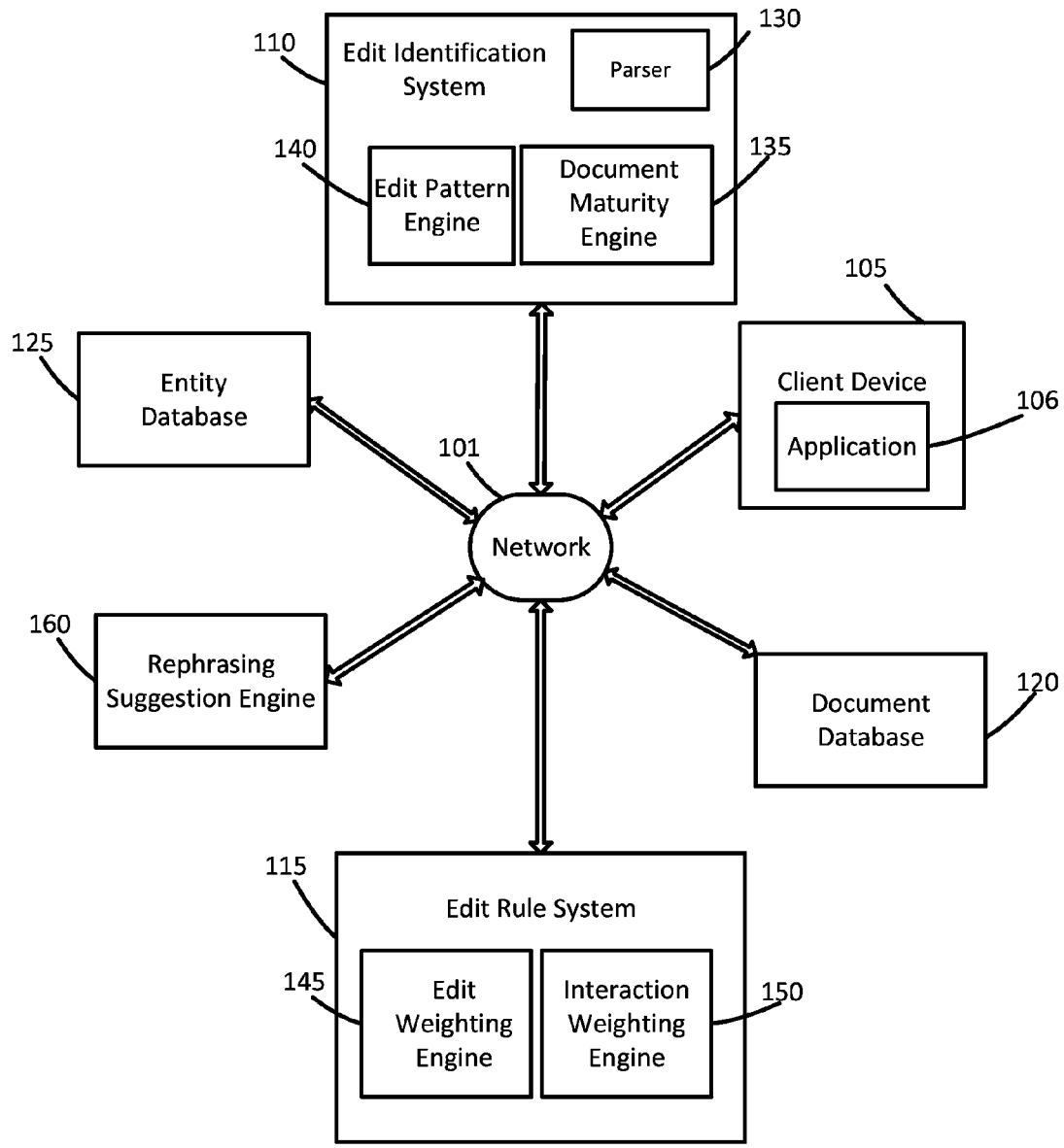
FIG. 1 is a block diagram of an example environment in which one or more edit rules may be determined based on identified user edits in documents and/or in which determined edit rules may be applied to future phrases.

FIG. 1 illustrates a block diagram of an example environment in which one or more edit rules may be determined based on identified edits of phrases in documents and/or in which determined edit rules may be applied to future phrases. The example environment includes a communication network 101 that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques. The example environment also includes a computing device 105 executing an application 106, an edit identification system 110, an edit rule system 115, a document database 120, and an entity database 125.

Computing device 105 may be a computer coupled to one or more components illustrated in FIG. 1 through one or more networks 101 such as a local area network (LAN) or wide area network (WAN) such as the Internet. The computing device 105 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. Application 106 is an application that is executing on computing device 105 and may be utilized, for example, to provide a user with an interface to create and/or edit one or more documents. Users may utilize application 106 to create a document (e.g., a word processing document, an email, a blog posting, an instant message), access an already created document, and/or edit a document that has been created previously by the user and/or one or more other users.

As described herein, user edits with documents via computing device 105 may be utilized to determine edit rules. Although only a single computing device 105 is illustrated in FIG. 1, it is understood that edits by multiple users via multiple computing devices may be utilized to determine edit rules according to techniques described herein. As also described herein, rephrasing suggestions determined based on edit rules may be presented to users via one or more applications executing on computing devices such as via application 106 of computing device 105. Application 106 is one example of an application but is not meant to be limiting. Other example applications include stand-alone word processing document applications, email applications, search applications, personal assistant applications, etc.

Documents that are created by one or more users may be stored in document database 120. In this specification, the term "database" will be used broadly to refer to any collection of data. The data of the database does not need to be structured in any particular way, or structured at all, and it can be stored on storage devices in one or more locations. Thus, for example, the document database 120 may include multiple collections of data, each of which may be organized and accessed differently. In some implementations, document database 120 may include multiple storage devices each storing document for only a single user. For example, a storage device of document database 120 may be integrated into computing device 105 and/or may be remotely accessible via communication network 101 to only one user. In some implementations, document database 120 may include documents from multiple users and document database 120 may be remotely accessible to multiple users, each of which may limit access to documents created by that user. For example, a user may allow one or more components, such as edit identification system 110, to access one or more documents created by the user. Also, for example, a user may grant another user permission to view and/or edit one or more documents. For instance, a user may create a document, store the document in document database 120, and grant permission to one or more users to access and edit the document.

Edit identification system 110 generally identifies edits of phrases by users in documents. An edit is a change of a phrase (pre-edit phrase) to a second phrase (post-edit phrase) by a user that is editing a document. Edits may include, for example, adding one or more characters to a phrase (e.g., adding one or more terms), removing one or more characters from a phrase (e.g., deleting one or more terms), altering the position of one or more terms in a phrase, and/or changing one or more characters of a phrase. A user may edit a phrase to, for example, clarify one or more terms, correct spelling and/or grammar in a phrase, add additional information to a phrase, and/or compress information in a phrase. Examples of edits include changing "The bill was 1000" to "The bill was $1,000.00" (clarification of a term), "Dogs and cats is animals" to "Dogs and cats are animals" (grammatical correction), "Bill and Sue are friends" to "They are friends" (compression of information), and "Spiders have eight legs and ants have six" to "Spiders have eight legs and ants have six legs" (clarification of a term).

In some implementations, an edit may be associated with one or more attributes of the document in which the edit was made (e.g., a type associated with the document, a maturity level of the document), one or more attributes of a user that created the pre-edit string of the edit (e.g., a group of which the user is a member), one or more attributes of a user that created the post-edit string of the edit (may be the same or different from the user that created the pre-edit string), a time and/or date when the edit occurred, and/or other information related to the edit. In some implementations, edit identification system 110 may identify edits and/or patterns of edits only if the edits occur in mature documents. A mature document is a document that has been created by a user and that has reached at least a threshold level of completeness. As one example, edit identification system 110 may not identify edits from documents that are in the early stages of composition and/or edit identification system 110 may only identify edits that occur after a document has reached a maturity level. In some implementations, edit identification system 110 may associate an edit with an indication of a maturity level of the document in which the edit was made (e.g., indications such as "not mature", "mature", "very mature"). In some of those implementations, the weight given to the edit in determining an edit rule based on the edit may be based on the maturity level of the document in which the edit was made. In some implementations, limiting edits to mature documents and/or to portions of documents that are beyond an initial draft phase (or otherwise taking into account the maturity level of documents), may enable edit rules to be determined based on more meaningful edits and extraneous early edits, which may not be useful in determining certain edit rules, may be ignored and/or given less weight.

In some implementations, edit identification system 110 may be a component executing, in whole or in part, on computing device 105. For example, edit identification system 110 may identify user edits locally from application 106 and provide the edits to edit rule system 115 via communication network 101. In some implementations, edit identification system may be included as part of application 106 and may identify user edits and store the edits with additional information in one or more databases. For example, for documents created via application 106, application 106 may store those documents in document database 120, along with information pertaining to edits of those documents, such as pre-edit phrases, post-edit phrases, users and/or attributes of users that performed the edit, edit time, and/or other information associated with edit.

Document maturity engine 135 may identify a maturity level for documents. The maturity level of a document may be utilized, for example, to determine whether the document is a mature document. In some implementations, whether a document is a mature document may be utilized to determine whether edits to the document are stored for potential use in determining an edit rule and/or to determine whether stored edits to the document will be used in determining an edit rule. Generally, a mature document is a document that has been sufficiently edited by one or more users such that subsequent edits to the document are useful in determining edit rules. For example, early in the creation of a document, the user may add new sentences, make significant changes to sentences, and/or otherwise make significant adjustments to a document. In some implementations, it may not be desirable to determine one or more edit rules based on those early changes. In some of those implementations, edits to a document may not be identified from the document and/or stored for usage in determining edit rules until a maturity level of the document is indicative of the document being completion mature document.

In some implementations, document maturity engine 135 may determine a maturity level for a document based on a time period since the document was initially created. For example, document maturity engine 135 may identify a creation time of a document and determine a document maturity level that is indicative of maturity based on whether the document has been created for at least a threshold time period. In some implementations, the threshold time period may be determined based on one or more characteristics of the document. For example, a threshold time period of an email may be less than a threshold time period of a legal document since emails typically reach a mature level of completion before more complex documents. In some implementations, a threshold time period may be determined based on one or more characteristics of a user associated with the document. For example, documents of a user that typically completes documents in a shorter period of time may have a threshold time period that is shorter than a user that is identified as taking longer to complete documents. Also, for example, a document may be determined to be mature when a user other than the creator of the document edits the document. In some implementations, other indications of time may be utilized to determine maturity of a document. For example, a break in time between initial creation of a document and edits may be an indication that a draft of the document was completed, such as an indication that the user stopped composition of the document and resumed editing at a later period of time after completing a draft of the document.

Parser 130 may identify document edits by a user, each of the edits including a pre-edit phrase that has been edited by a user to a post-edit phrase. For example, parser 130 may identify a string of text in a document as a phrase. In some implementations, parser 130 may identify a phrase by one or more delineating features of text from the document (text that is included in the phrase or separate from the phrase). For example, parser 130 may identify a phrase based on punctuation in text. For instance, parser 130 may identify the text between periods as phrase, text separated by one or more commas as a phrase, multiple sentences of text between periods and including one or more periods as a phrase, etc.

In some implementations, parser 130 may identify grammatical information associated with one or more terms in text. In some implementations, the grammatical information may be utilized by parser 130 to identify phrases. In some implementations, the grammatical information may be associated with identified pre-edit and post-edit phrases and one or more edit rules may be determined based on the grammatical information. Parser 130 may be configured to identify and annotate various types of grammatical information in one or more segments of a document. For example, the parser 130 may include a part of speech tagger configured to annotate terms in one or more segments with their grammatical roles. For example, the part of speech tagger may tag each term with its part of speech such as "noun," "verb," "adjective," "pronoun," etc. (parts of speech are denoted herein with square brackets). Also, for example, in some implementations, parser 130 may additionally and/or alternatively include a dependency parser configured to determine syntactic relationships between terms in one or more segments. For example, the dependency parser may determine which terms modify other terms, subjects and verbs of sentences, and so forth (e.g., a parse tree)—and may make annotations of such dependencies. For example, parser 130 may identify a prepositional phrase as a phrase by determining parts of speech of one or more terms and identifying the terms that conform to a prepositional phrase format (e.g., [preposition]+[noun]).

In some implementations, parser 130 may additionally and/or alternatively include an entity tagger configured to annotate entity references in one or more segments such as references to people, organizations, locations, and so forth. For example, the entity tagger may annotate all references to a given person in one or more segments of a document. The entity tagger may annotate references to an entity at a high level of granularity (e.g., to enable identification of all references to an entity type such as people) and/or a lower level of granularity (e.g., to enable identification of all references to a particular entity such as a particular person). The entity tagger may rely on content of the document to resolve a particular entity and/or may optionally communicate with a knowledge graph or other entity database to resolve a particular entity, such as entity database 125. Also, for example, in some implementations, parser 130 may additionally and/or alternatively include a coreference resolver configured to group, or "cluster," references to the same entity based on one or more contextual cues. For example, "Daenerys Targaryen," "Khaleesi," and "she" in one or more segments may be grouped together based on referencing the same entity. In some implementations, the coreference resolver may use data outside of a textual segment (e.g., metadata or a knowledge graph) to cluster references. For instance, a document that is a message may only contain a reference to "you" and the coreference resolver may resolve the reference to "you" to a person to which the message is addressed.

In some implementations, parser 130 may be configured to identify an edit by identifying a change in one or more characters of a string and determining a phrase that includes the characters that were changed. For example, parser 130 may identify a change of a series of characters, identify the pre-edit phrase that was in the document before the edit, and identify the post-edit phrase that is in the document after the edit. In some implementations, parser 130 may provide one or more components with the edit (i.e., the phrases and, in some instances, additional information related to the edit, such as the document, document type, user attributes, etc.). For example, parser 130 may store edits in document database 120 for later utilization, provide edits to edit pattern engine 140 to identify edits that conform to a pattern, and/or provide one or more edits to edit rule system 115 to update an existing edit rule (e.g., to add new post-edit phrases to an existing rule based on new post-edit phrases identified in one or more new edits).

In some implementations, parser 130 may determine that an edit is complete based on one or more actions (or inactions) of the user that is performing the edit. For example, parser 130 may determine that an edit is complete based a threshold length of time in which the user has not entered any characters. Also, for example, parser 130 may determine that an edit is complete when the user has indicated a different part of the document, such as by clicking in a different part of the document and/or moving a mouse to a different part of the document. Also, for example, parser 130 may determine that an edit is complete when the user otherwise performs an action other than entering characters (scrolling, saving the document, right clicking a mouse, etc.).

In some implementations, parser 130 may store and/or provide edits as the terms of the edits themselves (optionally canonicalized) and/or a combination of one or more categories and/or terms. For example, parser 130 may identify a pre-edit phrase of "The bill is 1000" and identify one or more entities associated with terms of the phrase, such as identifying "1000" as a number and/or as a representation of the number 1,000. Parser 130 may store the pre-edit phrase as "The bill is [number 1000]," "The [noun] is 1000," and/or one or more other representations of the phrase "The bill is 1000." Parser 130 may identify one or more categories of terms in phrases via entity database 125.

As an example, a user may be editing a document and edit a sentence from "The bill was 1000." to "The bill was $1,000." Parser 130 may identify a change in characters (i.e., the addition of a "$" and ",") followed by inaction of the user for a threshold period of time, and identify the pre-edit phrase and the post-edit phrase of the edit. Parser 130 may identify the phrases based on the phrases beginning with a capital letter and ending with a period (i.e., identifying a whole sentence as a phrase), and the post-edit phrase being located in the same relative position of the document as the pre-edit phrase. Parser 130 may store the edit in documents database 120 for later utilization by one or more components. In some implementations, parser 130 may additionally identify the document, one or more attributes of the document, the editing user, one or more attributes of the user, and/or additional information that may be stored with the edit.

In some implementations, parser 130 may identify edits from a particular set of edits in a document. For example, parser 130 may identify only the last 20% of edits to a document. Also, for example, parser 130 may identify one or more portions of a document that document maturity engine 135 has identified as mature and identity only those edits that are present in the mature portion of the document. In some implementations, parser 130 may identify multiple edits of a set of characters as separate edits. For example, parser 130 may identify an edit of Phrase A to Phrase B and subsequently an edit of Phrase B to Phrase C. In some implementations, parser may identify an edit with Phrase A as the pre-edit phrase and Phrase B as the post-edit phrase, an edit with Phrase A as the pre-edit phrase and Phrase C as the post-edit phrase, and/or an edit with Phrase B as the pre-edit phrase and Phrase C as the post-edit phrase.

Figure 2:
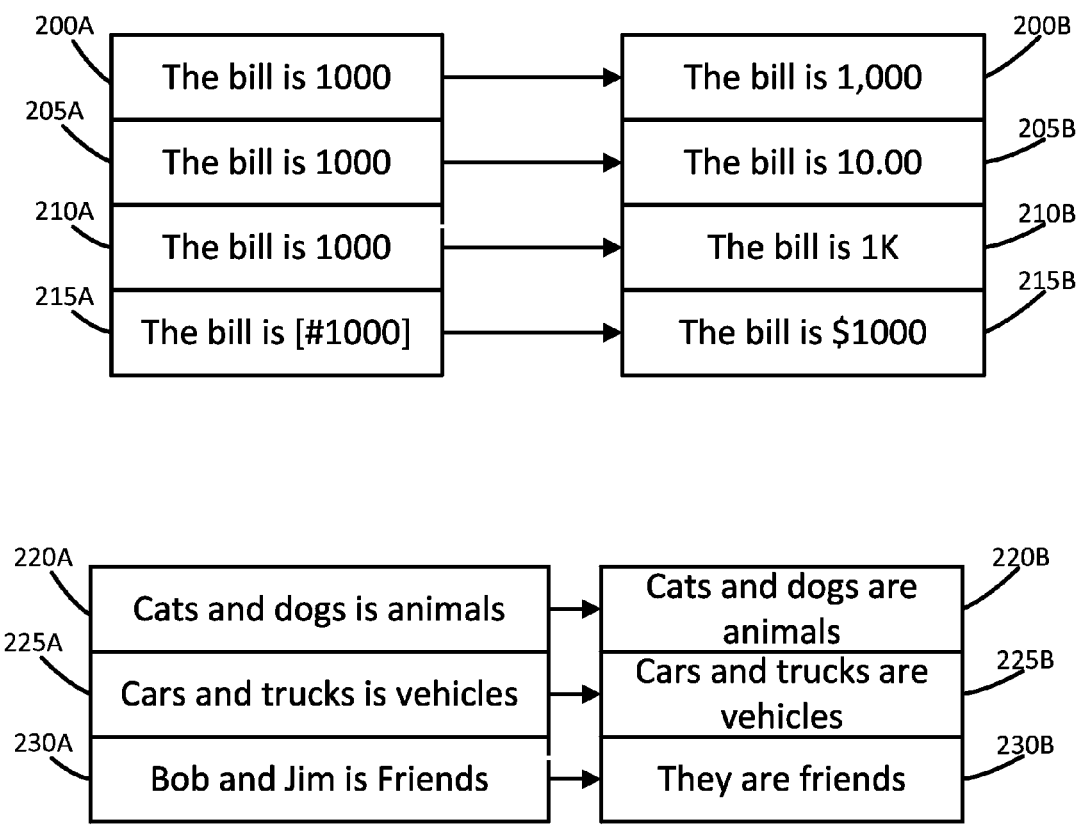
FIG. 2 illustrates examples of identified sets of edits that may be utilized to determine one or more edit rules.

Referring to FIG. 2, illustrated examples of identified sets of edits that may be utilized to determine one or more edit rules are provided. The illustration includes pre-edit phrases 200A, 205A, 210A, 215A, 220A, 225A, and 230A; and corresponding post-edit phrases 200B, 205B, 210B, 215B, 220B, 225B, and 230B. The illustrated pre-edit phrases and post-edit phrases may be identified by a component that shares one or more characteristics with parser 130 from edits made by users in a plurality of documents. In addition to explicit pre-edit phrases of 200A, 205A, 210A, 220A, 225A, and 230A, a pre-edit phrase 215A of "The bill is [#1000]" may be identified by parser 130 from an explicit edit in a document with one or more tokens of a pre-edit phrase replaced with a category or entity representing the one or more tokens; in this case, an entity associated with the number 1000. Each of the pre-edit phrases is associated with the post-edit phrase that was identified by parser 130 as replacing the respective pre-edit phrase in a document. The edits may be stored in a database for later utilization by one or more systems.

Edit pattern engine 140 utilizes the edits identified by parser one or more edits to identify a set of edits that have identical or similar pre-edit phrases. In some implementations, parser 130 may provide edits to edit pattern engine 140 as the edits are identified in one or more documents. For example, parser 130 may be a component executing on computing device 105 and parser 130 may provide edits from mature documents as users perform the edits. In some implementations, parser 130 may store edits and/or edits that include one or more terms replaced by an entity or category in document database 120 and edit pattern engine 140 may identify the edits at a later time.

Edit pattern engine 140 may identify edits with identical or similar pre-edit phrases as a set of edits that is potentially suitable for determining an edit rule. For example, edit pattern engine 140 may identify a plurality of edits that have pre-edit phrases of "The bill is 1000" as a set to provide to edit rule system 115 for determining a rule. In some implementations, edit pattern engine 140 may identify one or more edits that include categories and/or entities as determined by parser 130. For example, edit pattern engine 140 may identify one or more edits that parser 130 stored as "The bill is [representation of 1000]."

In some implementations, edit pattern engine 140 may identify edits that include pre-edit phrases with a similar pattern or that are otherwise similar. For example, referring again to FIG. 2, edit pattern engine 140 may identify the pre-edit phrases 220A, 225A, and 230A as conforming to a pattern of "[noun] and [noun] is [noun]." In some implementations, edit pattern engine 140 may identify additional edits as the edits are determined by parser 130. For example, edit pattern engine 140 may identify 220A, 225A, and 230A from document database 120, and parser 130 may later provide an edit with a pre-edit phrase of "She and I is adults" to edit pattern engine 140 to include with the other conforming edits.

In some implementations, edit pattern engine 140 may identify edits that are associated with similar additional information. For example, parser 130 may determine an edit from a document and store the edit with one or more attributes of the document, such as a document type. Edit pattern engine 140 may identify a set of edits that have similar pre-edit phrases and that are additionally associated with the same document type. As used herein, a document type of a document may be based on a file name extension of the document, an application utilized to create the document, content of the document, or other attributes of the document that enable assignment of the document type to the document. As another example, parser 130 may identify one or more attributes of the user that performed an edit and store the one or more attributes with the edit. Edit pattern engine 140 may identify a set of edits that have similar pre-edit phrases and that are additionally are associated with users with the same or similar attributes. In some implementations, edit pattern engine 140 may identify a set of edits without regard to additional attributes that may be associated with the edits (i.e., identify edits based solely on similarity of pre-edit phrases).

As another example of a set of edits, edit pattern engine 140 may identify edits that include similar information but in a different order. For example, edit pattern engine 140 may identify a set of edits that include edits of the phrase "yesterday's news" to one or more other phrases, such as an edit to "The news of yesterday" and/or an edit to "August 10's news" that occurred on August 11. Edit pattern engine 140 may identify the set based on, for example, similarity between entities associated with one or more terms of the user pre-edit and/or post-edit phrases, similarity of one or more terms of the pre-edit and post-edit phrases, and/or one or more other techniques as described herein.

Edit rule system 115 may utilize a set of edits identified by edit pattern engine 140 to determine an edit rule based on the edits of the set. An edit rule associates a pre-edit phrase with one or more potential post-edit phrases. An edit rule may be utilized to automatically determine one or more rephrasings of a future phrase that conforms to the pre-edit phrase of the edit rule. For example, an edit rule may be determined from a plurality of edits that each include a pre-edit phrase of "The bill is 1000," and an associated post-edit phrase. Based on a future phrase of "The bill is 1000," rephrasing suggestion engine 160 may identify the edit rule with "The bill is 1000" as the pre-edit phrase, and provide the user with one or more of the associated post-edit phrases as a suggestion for rephrasing the phrase.

Figure 3:
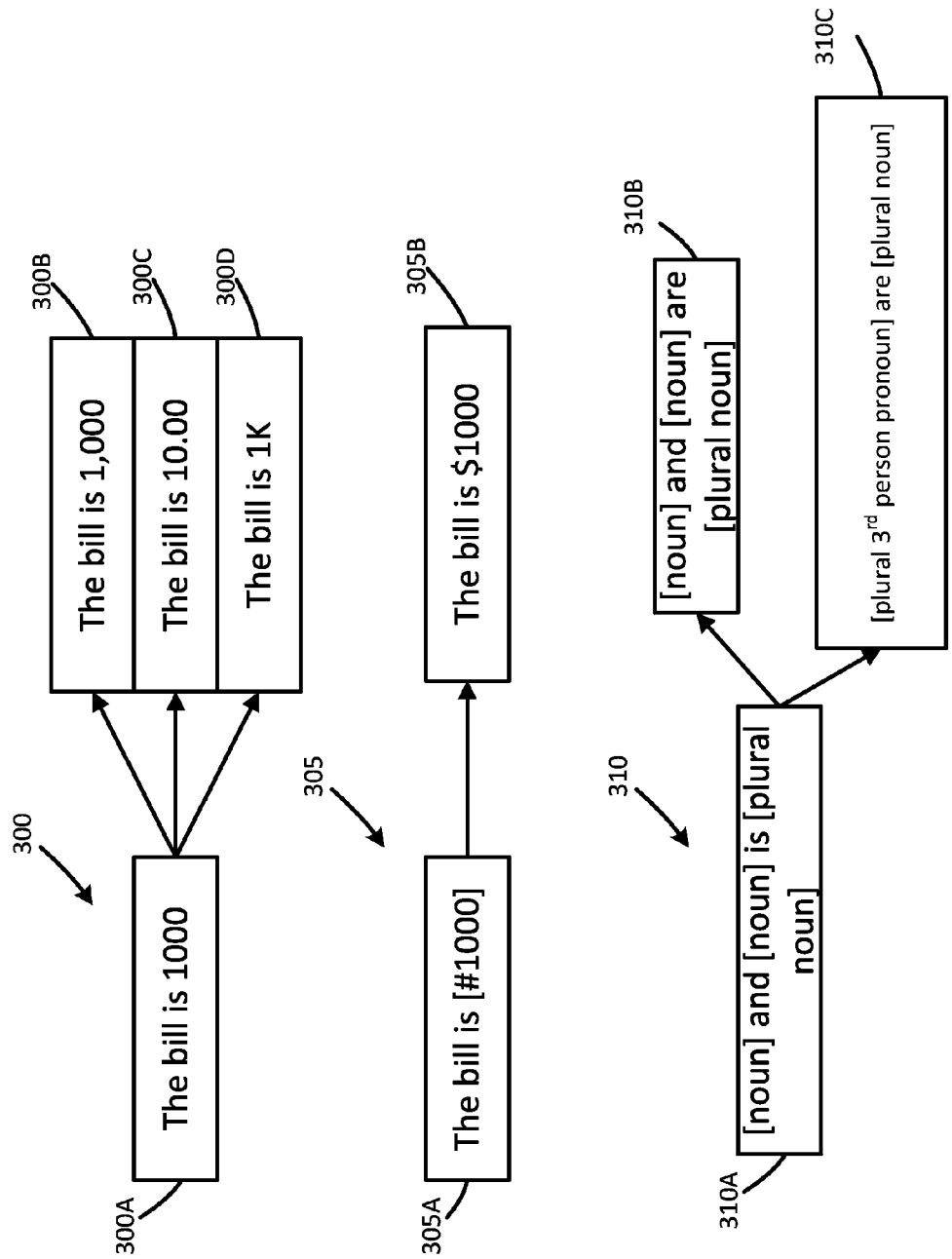
FIG. 3 illustrates examples of edit rules that may be determined based on identified edits.

For example, referring to FIG. 3, examples of edit rules that may be determined based on identified edits are illustrated. The three illustrated edit rules may be determined by edit rule system 115 based on the edits illustrated in FIG. 2. For example, edit rule 300 may be determined based on edit pattern engine 140 identifying edits with a pre-edit phrase of "The bill is 1000" and providing the edits to edit rule system 115. Edit rule system 115 may determine edit rule 300 with a pre-edit phrase that is same as the pre-edit phrases of the identified edits (i.e., 200A, 205A, and 210A), and post-edit phrases (300B, 300C, and 300D) that correspond to the identified post-edit phrases of the edits (200B, 205B, and 210B).

In some implementations, edit rule system 115 may determine a rule wherein the pre-edit phrase includes categories of one or more terms. For example, edit rule 305 includes a pre-edit phrase 305A of "The bill is [#1000]" (with [#1000] denoting a category of representations of the number 1,000). Edit rule 305 may be determined based edits that includes pre-edit phrases that conform to the pattern of pre-edit phrase 305A. For example, edit pattern engine 140 may identify pre-edit phrases 200A, 205A, and 210A, and provide the associated edits to edit rule system 115, which may determine a pattern of the pre-edit phrases and further determine an edit rule based on the associated post-edit phrases. Edit rule 305 includes one potential post-edit phrase 305B; however, one or more additional phrases may be included with the edit rule based on the edits utilized to determine the edit rule, as is illustrated with respect to edit rule 300. In some implementations, edit rule system 115 may determine an edit rule based on a combination of phrases and patterns. For example, edit rule system 115 may determine edit rule 300 and/or edit rule 305 based on a provided set of edits that includes the pre-edit phrases of 200A, 205A, 210A, and 215A.

In some implementations, edit rule system 115 may determine an edit rule that includes one or more patterns as post-edit phrases. For example, referring again to FIG. 3, rule 310 may be determined from a set of edits that includes the second set of edits illustrated in FIG. 2 (i.e., edits with pre-edit phrases of 220A, 225A, and 230A). As illustrated, rule 310 includes a pattern for the pre-edit phrase 310A of the edit rule that generalizes the pre-edit phrases of the identified edits, and a post-edit phrase that generalizes the post-edit phrases of the identified edits. For example, pre-edit phrase 220A of "Cats and dogs is animals" may be annotated with parts of speech and a parse tree by parser 130. Edit pattern engine 140 may identify other edits that have been annotated with the same or similar parts of speech and parse tree by parser 130, such as pre-edit phrase 225A and pre-edit phrase 230A. Edit pattern engine 140 may provide the edits to edit rule system 115, which may determine an edit rule that includes the identified pattern of the pre-edit phrases of the edits, "[noun] and [noun] is [plural noun]," and further post-edit phrases 310B and 310C based on the post-edit phrases of the provided edits (i.e., post-edits 220B, 225B, and 230B). As another example, edit rule system 115 may determine an edit rule that rearranges one or more terms of a phrase to determine rephrasings. For example, edit rule system 115 may determine a rule that rephrases "[Name]'s [object]" to "the [object] of [Name]" from a set of edits that includes edits of "Bob's car" to "The car of Bob," and "Jim's job" to "the job of Jim." Also, for example, edit rules may be determined that include synonyms of terms from a pre-edit phrase in one or more of the post-edit phrases (e.g., "Jim's job" edited to "Jim's career" and/or "Jim's occupation" may be utilized to determine an edit rule of "[Name]'s job" to "The [synonym of job] of [Name]").

In some implementations, an edit rule may be associated with one or more attributes. For example, edit rule system 115 may determine an edit rule from a set of edits that were identified by parser 130 in documents with an identified document type. Edit rule system 115 may associate the document type with the edit rule to indicate that the edit rule is for use in determining rephrasings of phrases in documents of the same type. Also, for example, edit rule system 115 may identify multiple document types that are associated with the edits that were utilized to determine an edit rule and determine weights for various types of associated documents. For instance, edit pattern engine 140 may provide 100 edits, 40 of which came from emails and 60 of which came from blog entries, and edit rule system 115 may determine weights for the resulting edit rule that are more indicative of usefulness of the edit rule for suggesting rephrasings in future emails and less indicative of usefulness of the edit rule for suggesting rephrasings in future blog entries. In some implementations, edit rule system 115 may associate one or more attributes of users with an edit rule. For example, edit pattern engine 140 may determine a set of edits that were performed by users with a particular attribute and associate the attribute with the edit rule for later utilization in suggestion rephrasings to users with that attribute. In some implementations, only post-edit phrases that are identified at least a threshold number of times may be included as post-edit phrases of an edit rule.

In some implementations, edit weighting engine 145 may determine weights for one or more post-edit phrases of edit rules. In some implementations, the weights may be determined based on the edits that were utilized to determine a rule. For example, referring to FIG. 3, the post-edit phrases 300B, 300C, and 300D of edit rule 300 may each be weighted based on a count of edits that were utilized to determine the rule. For instance, if 200 edits were identified with a pre-edit phrase of "The bill is 1000" and a post-edit phrase of "The bill is 1,000," and 300 edits were identified with the same pre-edit phrase and a post-edit phrase of "The bill is 10.00," edit weighting engine 145 may determine a weight for 300B that is more indicative of rephrasing with 300B than a weight for 300C.

In some implementations, edit weighting engine 145 may determine weights for one or more post-edit phrases of edit rules based on an editor experience measure associated with one or more users that implemented changes from the pre-edit phrase to a post-edit phrase. An editor experience measure for a given user may be determined based on, for example, the number of documents that the given user has previously edited, the number of edits that the given user has performed, analysis of quality of writing by the user (including or restricted to the quality of the document in which the user implemented the edit), and/or other indications of a writing skill level of the user.

As an example, an edit rule may be determined with a pre-edit phrase of Phrase A and post-edit phrases of Phrase B and Phrase C. Edit weighting engine 145 may identify five edits of Phrase A to Phrase B by one or more users that all have editor experience measures that are highly indicative of editor experience and further identify five edits of Phrase A to Phrase C by one or more users with editor experience measures that are less indicative of editor experience. An edit rule may be determined for rephrasing of Phrase A to post-edit phrases of Phrase B and Phrase C. Edit weighting engine 145 may determine a weight for the post-edit phrases of the edit rule such that Phrase B is more indicative of rephrasing than Phrase C based on the editor experience measures of the users that implemented the change to Phrase B being more indicative of quality edits than rephrasings of Phrase A to Phrase C.

In some implementations, rephrasing suggestion engine 160 may identify a phrase that conforms to one or more pre-edit phrases of edit rules, and determine one or more rephrasings of the phrase based on those edit rules. In some implementations, rephrasing suggestion engine 160 may identify the phrase in a document being actively edited by a user and provide one or more of the determined rephrasings to the user as options for replacing the phrase. In implementations where the post-edit phrases of edit rules are weighted for the edit rules, the presentation of rephrasings determined based on the post-edit phrases may be provided to the user based on the weights (e.g., a rephrasing determined based on an edit rule post-edit phrase with the weight most indicative of rephrasing may be provided most prominently to the user). Although examples herein are described with respect to utilizing edit rules to determine rephrasings of phrases in documents, edit rules may be utilized to determine rephrasings of phrases that are not associated with a document. For example, edit rules may be utilized to determine rephrasings of as spoken or typed queries of users that are provided to a search system, a translation system, or other system.

Figure 4:
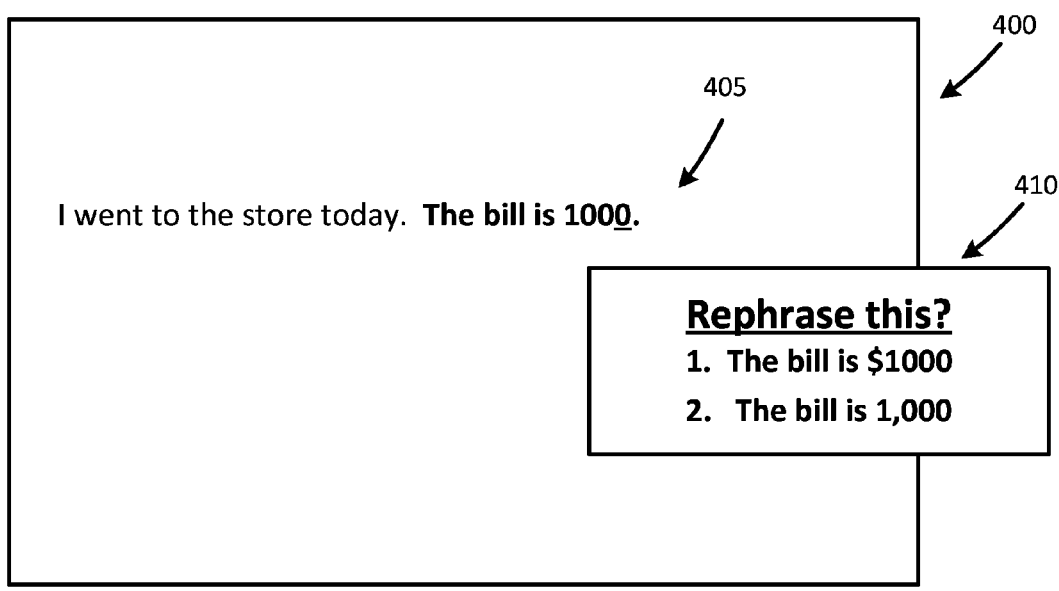
FIG. 4 is an illustration of an example interface for providing rephrasing suggestions to a user.

Referring to FIG. 4, an illustration of an example interface for providing rephrasing suggestions to a user is provided. The user may be composing document 400, which includes phrase 405 of "The bill was 1000." The user is provided with suggestions 410 that present the user with rephrasings that have been determined based on one or more edit rules. For example, phrase 405 conforms to the pre-edit phrase of rule 300 of FIG. 3, and rephrasing suggestion engine 160 may provide suggestions 410 based on the post-edit phrases of rule 300. The suggestions may be provided to the user automatically upon detection of edit rules that conform to the phrase 405 and/or following an input by the user such as a selection of the phrase 405 and/or an interface element. In some implementations, rephrasing suggestion engine 160 may replace a phrase that conforms to a pre-edit phrase of a rule with a post-edit phrase of the rule. For example, the phrase "The bill was 1000" may be identified in a document and rephrasing suggestion engine 160 may replace the phrase in the document with a post-edit phrase of the edit rule. The replacement may be done automatically, optionally after the user selects the post-edit phrase from suggestions 410.

In some implementations, rephrasing suggestion engine 160 may identify a document type and/or an attribute of a user and only identify edit rules that are associated with that document type and/or that attribute. For example, rephrasing suggestion engine 160 may identify a document type for document 400 and only provide rephrasing suggestions based on edit rules that are associated with that document type. Also, for example, rephrasing suggestion engine 160 may identify the user that is editing document 400 and only provide rephrasing suggestions that are associated with one or more attributes that are additionally associated with the user.

In some implementations, rephrasing suggestion engine 160 may provide one or more suggestions based on weights that are determined for one or more post-edit phrases associated with an edit rule. For example, rephrasing suggestion engine 160 may provide only suggestions based on post-edit phrases that satisfy a threshold weight. Also, for example, rephrasing suggestion engine 160 may provide only a certain number of suggestions based on those post-edit phrases with the highest weights. Also, for example, rephrasing suggestion engine 160 may provide suggestions in an order that is determined based on associated weights of post-edit phrases. For instance, referring to FIG. 4, suggestions 410 may be provided in an order based on weights associated with the post-edit phrases of an edit rule (i.e., "The bill is $1000" may have a weight that is more indicative of frequency in past identified edits than "The bill is 1,000").

In some implementations, interaction weighting engine 150 may identify a rephrasing suggestion that a user has selected and/or otherwise shown interest in and adjust the weight of one or more post-edit phrases of an edit rule. For example, referring to FIG. 4, a user may select "The bill is 1,000" as a rephrasing of phrase 405, and interaction weighting engine 150 may "increase" a weight associated with the post-edit phrase "The bill is 1,000" for the associated edit rule (and/or "decrease" a weight associated with "The bill is $1000).

Figure 5:
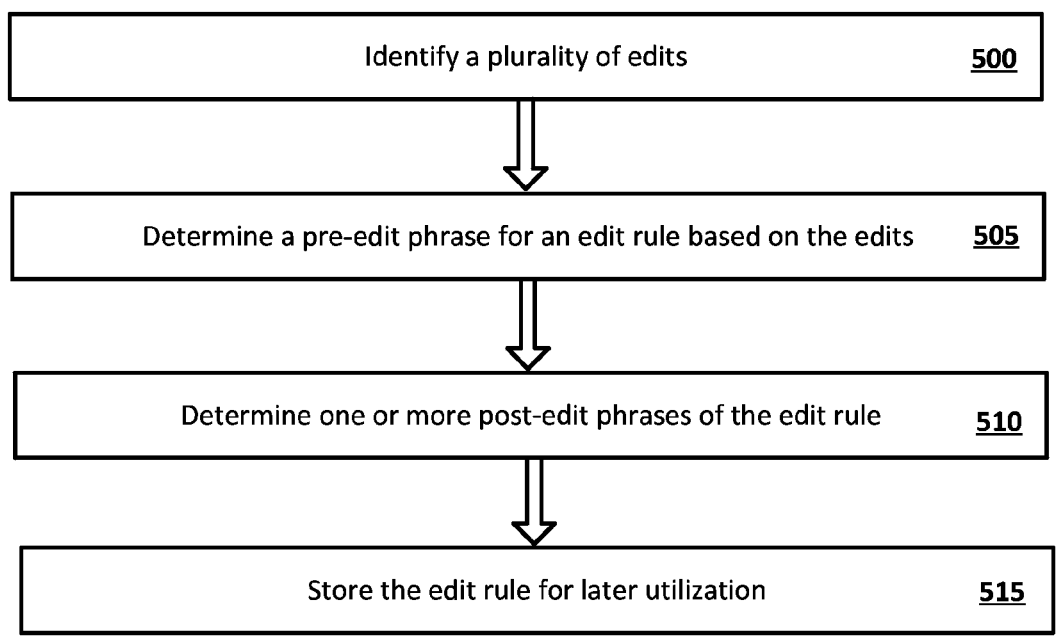
FIG. 5 is a flowchart of an example method for determining an edit rule based on a plurality of user edits identified in documents.

Referring to FIG. 5, a flowchart of an example method for determining an edit rule based on a plurality of user edits identified in documents is provided. Other implementations may perform the steps in a different order, omit certain steps, and/or perform different and/or additional steps than those illustrated in FIG. 5. For convenience, aspects of FIG. 5 will be described with reference to one or more components of FIG. 1 that may perform the method, such as edit identification system 110 and/or edit rule system 115.

At step 500, a plurality of edits are identified. In some implementations, the edits may be identified by a component that shares one or more characteristics with edit identification system 110. For example, a component that shares one or more characteristics with parser 130 may identify one or more edits in a document by identifying a change of one or more characters in the document, and identifying a phrase that includes the changed characters. In some implementations, parser 130 may tag one or more tokens of the phrase with entities and/or categories of terms. For example, parser 130 may identify terms in a phrase by parts of speech, entities, general categories, and/or other characteristics of the terms. In some implementations, parser 130 may utilize one or more tags associated with terms of a document to determine the phrase (e.g., selecting an entire prepositional phrase as a phrase).

In some implementations, edits may be identified from mature documents. For example, parser 130 may identify edits from documents that have been created for at least a threshold period of time. Also, for example, parser 130 may identify edits that occurred after a period of time without edits (e.g., a break by a user that may indicate completion of a first draft). In some implementations, parser 130 may identify edits from particular portions of one or more documents that have been determined to be mature. For example, parser 130 may identify only edits that occur in the last five pages of a document. In some implementations, parser 130 may identify only a last portion of edits from a document, such as the last 20% of edits to a document and/or the last 100 edits to a document.

At step 505, the pre-edit phrases of the identified edits are utilized to determine a pre-edit phrase for an edit rule. In some implementations, the pre-edit phrase of the edit rule may be determined by identifying edits that have the same pre-edit phrase. In some implementations, the pre-edit phrase of the edit rule may include one or more categories of terms that are determined by parser 130. For example, a component that shares one or more characteristics with edit pattern engine 140 may determine a pre-edit phrase of "[noun] and [noun] is [noun]" based on identifying a plurality of edits with pre-edit phrases that conform to the pattern.

At step 510, one or more post-edit phrases are determined for the edit rule. In some implementations, the post-edit phrases are determined based on the post-edit phrases of the edits that were identified and utilized to determine the pre-edit phrase of the edit rule. For example, a plurality of edits may be identified by edit pattern engine 140 that include a plurality of post-edit phrases that were determined by parser 130. The post-edit phrases may be utilized by one or more components to determine post-edit phrases for the pre-edit phrase. In some implementations, the post-edit phrases include one or more categories and/or characteristics that are related to the post-edit phrases of the edits. For example, a post-edit phrase of an edit rule may include one or more indications of nouns and/or categories of nouns. For example, a pre-edit phrase of an edit rule may include "[animal] is animals" and the post-edit phrase may additionally include "[animal] are animals" as an indication that the identified pre-edit phrases of edit include the name of an animal and the post-edit phrase for each of the edits may include the same animal as the corresponding pre-edit phrase and/or another term that is an animal.

At step 515, the edit rule is stored for later utilization to determine one or more rephrasings for a future phrase conforming to the pre-edit phrase of the edit rule. For example, the edit rule may be stored in document database 120 and utilized to determine one or more candidate rephrasings of a phrase that is identified in a document of a user. In some implementations, rephrasings of phrases may be determined based on edit rules utilizing a method that shares one or more characteristics with the process illustrated in FIG. 6.

Figure 6:
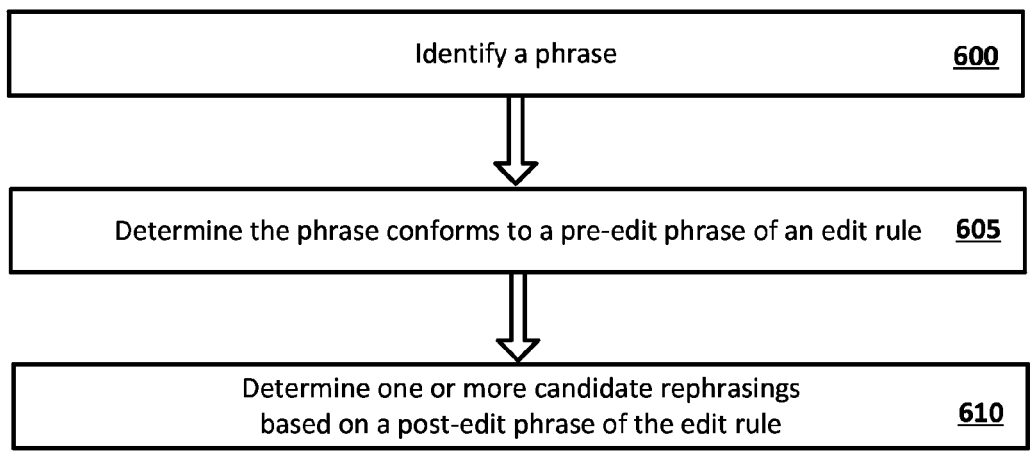
FIG. 6 is a flowchart of an example method for providing candidate rephrasings based on an edit rule.

Referring to FIG. 6, a flowchart of an example method for providing candidate rephrasings based on an edit rule is provided. Other implementations may perform the steps in a different order, omit certain steps, and/or perform different and/or additional steps than those illustrated in FIG. 6. For convenience, aspects of FIG. 6 will be described with reference to one or more components of FIG. 1 that may perform the method, such as rephrasing suggestion engine 160.

At step 600, a phrase is identified. In some implementations, the phrase may be identified in a document. For example, the identified phrase may be provided by a user while editing a document. Phrases may be identified by one or more components, such as parser 130, based on, for example, one or more terms in the phrase, punctuation of the phrase, tags of one or more terms of a phrase, and/or other techniques to determine a phrase from a document of text.

At step 605, the phrase is determined to conform to a pre-edit phrase of an edit rule. For example, an edit rule may include one or more terms and the phrase may be determined to conform to the edit rule if the phrase includes the same terms. Also, for example, in instances where a pre-edit phrase includes categories of terms, the phrase may be determined to conform to the phrase if the phrase includes terms that are associated with the corresponding categories in the pre-edit phrase of the edit rule. In some implementations, the edit rule may be associated with a particular document attribute and/or user attribute, and only edit rules that are associated with that document attribute and/or edits that were performed by a user with that particular attribute may be utilized to determine whether a phrase conforms to a pre-edit phrase of an edit rule.

At step 610, one or more candidate rephrasings of the phrase may be determined based on the post-edit phrases of the edit rule. In some implementations, a user may be provided with one or more of the post-edit phrases as a candidate rewrite of the phrase. For example, the phrase may be identified in a document of a user and the user may be provided with a prompt that indicates one or more phrases that may be utilized to rephrase and/or rewrite the phrase. In some implementations, one or more candidate rephrases may be provided based on weights associated with the rephrasings. For example, weights may be associated with the rephrasings based on counts of edits that previously included each of the post-edit phrases, and the rephrasings may be provided based on the weights (e.g., only the top weighted rephrasings are provided, only a certain percentage of the highest weighted rephrasings are provided, only rephrasings with a threshold weight, rephrasings provided in an order based on weights).

Figure 7:
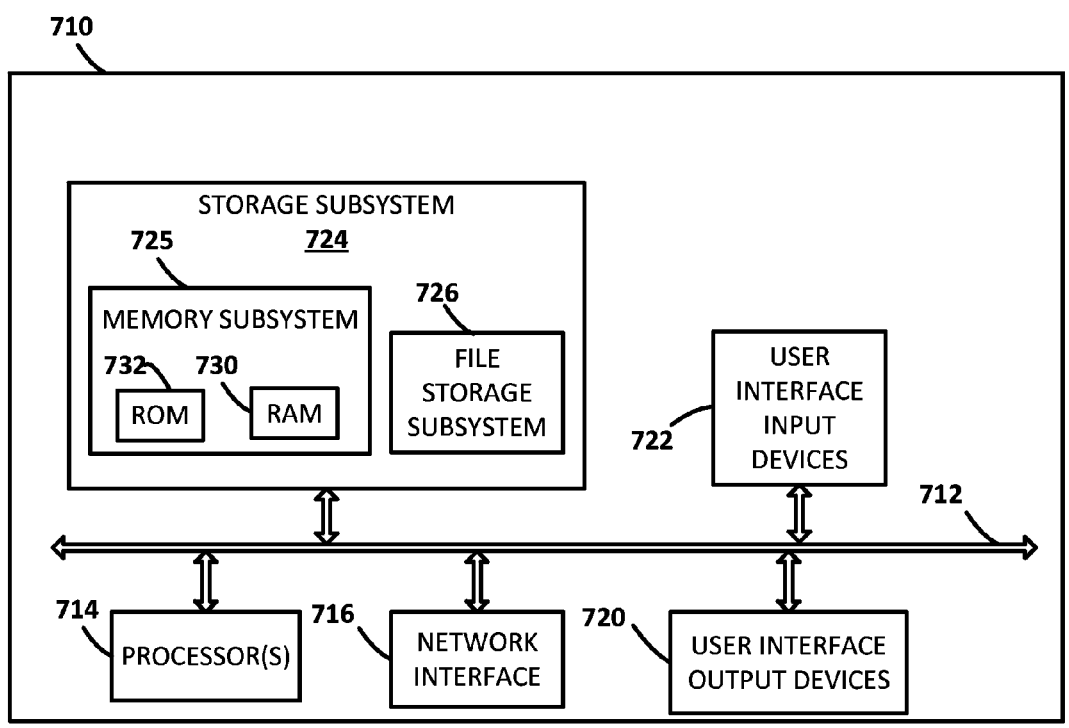
FIG. 7 illustrates a block diagram of an example computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface input devices 722, user interface output devices 720, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to determine an edit rule based on a plurality of edits of users. As another example, the storage subsystem 724 may include the logic to determine one or more candidate rephrasings of a phrase based on an edit rule.

These software modules are generally executed by processor 714 alone or in combination with other processors. Memory 725 used in the storage subsystem can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:
1. A computer implemented method, comprising:
identifying that each of a plurality of documents are mature based on one or more signals associated with the documents;
in response to identifying the documents as mature:

storing, via one or more networks, edits to the documents in at least one database for defining edit rules based on the edits, wherein the edits are from a plurality of users and are made via user interface input provided via applications executing on computing devices of the users, wherein each of the edits identifies one of a plurality of pre-edit phrases and an associated one of a plurality of post-edit phrases, and wherein each of a plurality of the edits is based on a user implemented change of the one of the pre-edit phrases to the one of the post-edit phrases in one of the plurality of mature documents;

determining an edit rule pre-edit phrase based on a set of one or more of the pre-edit phrases identified by the edits;

determining one or more edit rule post-edit phrases based on one or more of the post-edit phrases associated with the set of the one or more pre-edit phrases;

defining an edit rule that associates the edit rule pre-edit phrase with the edit rule post-edit phrases;

storing the edit rule for automatically determining, for a future phrase conforming to the edit rule pre-edit phrase, a rephrasing of the future phrase based on at least one of the edit rule post-edit phrases;

after storing the edit rule:
identifying a current document being edited by a given user via a given application of a given computing device of the given user, identifying that a given phrase in the current document conforms to the edit rule pre-edit phrase of the edit rule, in response to identifying that the given phrase conforms to the edit rule pre-edit phrase, determining a candidate rephrasing of the given phrase based on the edit rule, the determining comprising determining the candidate rephrasing based on a given one of the edit rule post-edit phrases of the edit rule, in response to user interface input provided at the given computing device, providing the candidate rephrasing of the given phrase for presentation to the user.

2. The method of claim 1, wherein the one or more signals based on which at least one document of the mature documents is identified as mature include at least one of:
a creation time of the document;
an amount of time since the document was last modified; and
a user associated with the document.

3. The method of claim 2, wherein the document is identified as mature if the user is not the creator of the document.

4. The method of claim 1, wherein a given edit of the edits is from a given document of the mature documents and wherein determining the given edit is based on determining the given document is mature.

5. The method of claim 4, wherein determining the given document is mature is based on a creator of the given document granting, to another user, edit access to the given document.

6. The method of claim 1, further comprising:
determining the set of the one or more of the pre-edit phrases based on at least one characteristic associated with each of the pre-edit phrases of the set;
wherein storing the edit rule further comprises storing an association of the characteristic to the edit rule; and
wherein determining the candidate rephrasing of the given phrase based on the edit rule is further based on determining that the given phrase has the characteristic and selecting the edit rule based on the stored association of the characteristic to the edit rule.

7. The method of claim 6, wherein the characteristic indicates a particular document type, of a plurality of document types, in which the pre-edit phrases of the set and the given phrase are included.

8. The method of claim 6, wherein the characteristic is indicative of one or more attributes of the users that generated the pre-edit phrases of the set and of the given user that generated the given phrase.

9. The method of claim 1, wherein determining the one or more edit rule post-edit phrases comprises:
identifying a first post-edit phrase of the post-edit phrases associated with the set of one or more pre-edit phrases;
determining a first count of associations of the first post-edit phrase with the one or more pre-edit phrases of the set; and
based on the first count of associations satisfying a threshold, determining at least one of the edit rule post-edit phrases based on the first post-edit phrase.

10. The method of claim 9, further comprising:
identifying a second post-edit phrase of the post-edit phrases associated with the set of one or more pre-edit phrases; and
determining a second count of associations of the second post-edit phrase with the one or more pre-edit phrases of the set;
wherein the threshold is based on the second count of associations.

11. The method of claim 1, further comprising:
identifying a first post-edit phrase and a second post-edit phrase of the post-edit phrases associated with the set of one or more pre-edit phrases;
determining a first edit rule post-edit phrase of the edit rule post-edit phrases based on the first post-edit phrase; and
determining a second edit rule post-edit phrase of the edit rule post-edit phrases based on the second post-edit phrase.

12. The method of claim 11, further comprising:
determining a first count of associations of the first post-edit phrase with the one or more pre-edit phrases of the set; and
determining a second count of associations of the second post-edit phrase with the one or more pre-edit phrases of the set;
wherein defining the edit rule comprises:
defining a first association of the edit rule pre-edit phrase with the first edit rule post-edit phrase and assigning a first weight to the first association, the first weight determined based on the first count of associations; and
defining a second association of the edit rule pre-edit phrase with the second edit rule post-edit phrase and assigning a second weight to the second association, the second weight determined based on the second count of associations.

13. The method of claim 1, further comprising:
identifying a first post-edit phrase associated with the set of one or more pre-edit phrases;
determining a first edit rule post-edit phrase of the edit rule post-edit phrases based on the first post-edit phrase; and
wherein defining the first edit rule comprises:
defining an association of the edit rule pre-edit phrase with the first edit rule post-edit phrase and assigning a weight to the association, the weight determined based on one or more edit experience measures of one or more of the users that implemented change of the pre-edit phrases of the set to the first post-edit phrase.

14. The method of claim 13, wherein a given edit experience measure of a given user of the users is based on one of: quality of previous edits of the given user and number of other edits performed by the given user.

15. The method of claim 1, wherein the edit rule pre-edit phrase includes one or more category identifiers, each of the category identifiers indicating one of: a part of speech, a category of entities, and a set of terms.

16. The method of claim 1, wherein at least one of the edit rule post-edit phrases includes one or more category identifiers, each of the category identifiers indicating one of: a part of speech, a category of entities, and a set of terms.

17. The method of claim 16, further comprising:
determining the category identifiers based on identifying members associated with the category identifiers in a plurality of the post-edit phrases associated with the set of the one or more pre-edit phrases.

18. The method of claim 1, further comprising:
identifying a selection of the candidate rephrasing to replace the given phrase in the current document; and
adjusting, based on the selection, a weight associated with the edit rule post-edit phrase for the edit rule.

19. The method of claim 1, wherein providing the candidate rephrasing is based on an attribute of the current document.

20. The method of claim 1, further comprising:
identifying an editor associated with the current document; and
wherein providing the candidate rephrasing is further based on an attribute of the editor.

21. A system, comprising:
memory storing instructions;
one or more processors operable to execute the instructions in the memory, wherein the instructions comprise instructions to:
identify that each of a plurality of documents are mature based on one or more signals associated with the documents;
in response to identifying the documents as mature:
store, via one or more networks, edits to the documents in at least one database for defining edit rules based on the edits, wherein the edits are from a plurality of users, and are made via user interface input provided via applications executing on computing devices of the users, wherein each of the edits identifies one of a plurality of pre-edit phrases and an associated one of a plurality of post-edit phrases, and wherein each of a plurality of the edits is based on a user implemented change of the one of the pre-edit phrases to the one of the post-edit phrases in one of the plurality of mature documents;
determine an edit rule pre-edit phrase based on a set of one or more of the pre-edit phrases identified by the edits;
determine one or more edit rule post-edit phrases based on one or more of the post-edit phrases associated with the set of the one or more pre-edit phrases;
define an edit rule that associates the edit rule pre-edit phrase with the edit rule post-edit phrases;
store the edit rule for automatically determining, for a future phrase conforming to the edit rule pre-edit phrase, a rephrasing of the future phrase based on at least one of the edit rule post-edit phrases;
after storing the edit rule:
identify a current document being edited by a given user via a given application of a given computing device of the given user,
identify that a given phrase in the current document conforms to the edit rule pre-edit phrase of the edit rule,
in response to identifying that the given phrase conforms to the edit rule pre-edit phrase, determine a candidate rephrasing of the given phrase based on the edit rule, the determining comprising determining the candidate rephrasing based on a given one of the edit rule post-edit phrases of the edit rule,
in response to user interface input provided at the given computing device, provide the candidate rephrasing of the given phrase for presentation to the user.

22. A non-transitory computer readable storage medium storing at least one program configured for execution by at least one processor of a computer system, the at least one program comprising instructions to:
identify that each of a plurality of documents are mature based on one or more signals associated with the documents;
in response to identifying the documents as mature:
store, via one or more networks, edits to the documents in at least one database for defining edit rules based on the edits, wherein the edits are from a plurality of users, and are made via user interface input provided via applications executing on computing devices of the users, wherein each of the edits identifies one of a plurality of pre-edit phrases and an associated one of a plurality of post-edit phrases, and wherein each of a plurality of the edits is based on a user implemented change of the one of the pre-edit phrases to the one of the post-edit phrases in one of the plurality of mature documents;
determine an edit rule pre-edit phrase based on a set of one or more of the pre-edit phrases identified by the edits;
determine one or more edit rule post-edit phrases based on one or more of the post-edit phrases associated with the set of the one or more pre-edit phrases;
define an edit rule that associates the edit rule pre-edit phrase with the edit rule post-edit phrases;
store the edit rule for automatically determining, for a future phrase conforming to the edit rule pre-edit phrase, a rephrasing of the future phrase based on at least one of the edit rule post-edit phrases,
after storing the edit rule:
identify a current document being edited by a given user via a given application of a given computing device of the given user,
identify that a given phrase in the current document conforms to the edit rule pre-edit phrase of the edit rule,
in response to identifying that the given phrase conforms to the edit rule pre-edit phrase, determine a candidate rephrasing of the given phrase based on the edit rule, the determining comprising determining the candidate rephrasing based on a given one of the edit rule post-edit phrases of the edit rule,
in response to user interface input provided at the given computing device, provide the candidate rephrasing of the given phrase for presentation to the user.

* * * * *